Dec. 8, 1970          M. KEZRAN          3,545,060
INTERCHANGEABLE INSERT AND HOLDER ASSEMBLY
Filed May 20, 1968
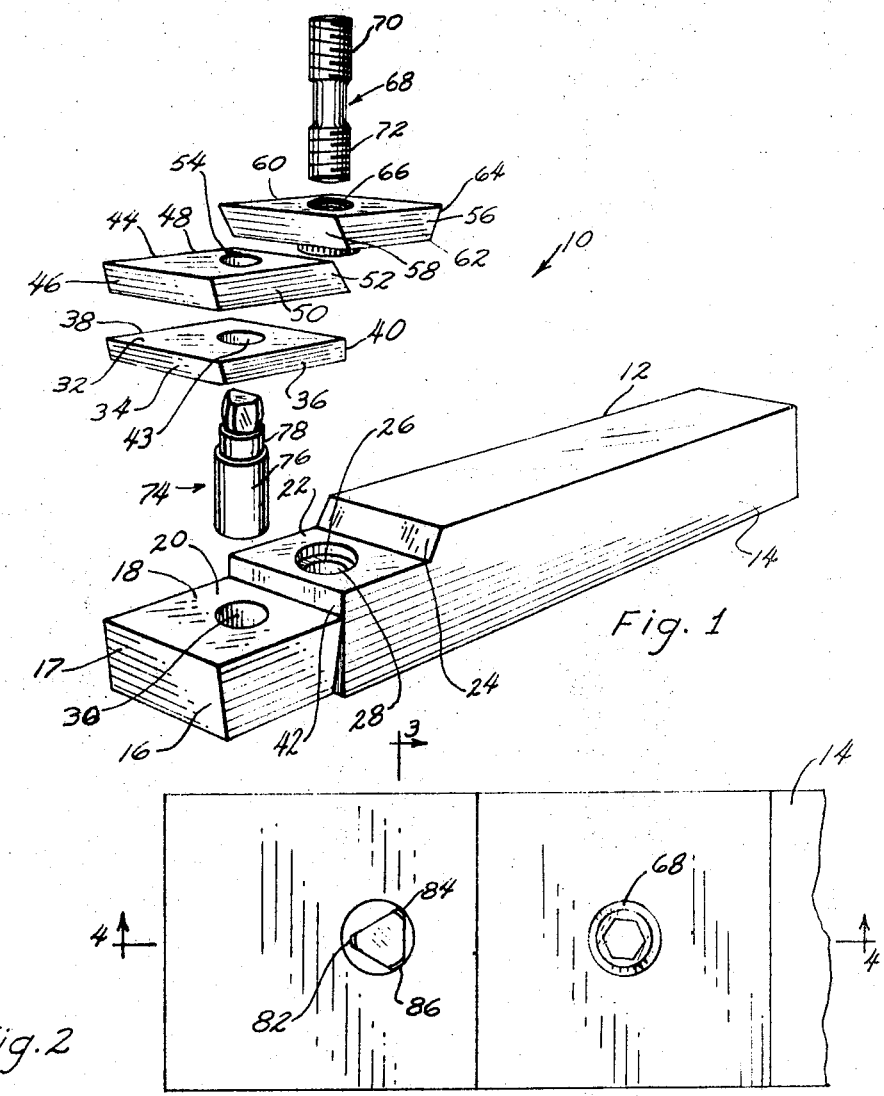
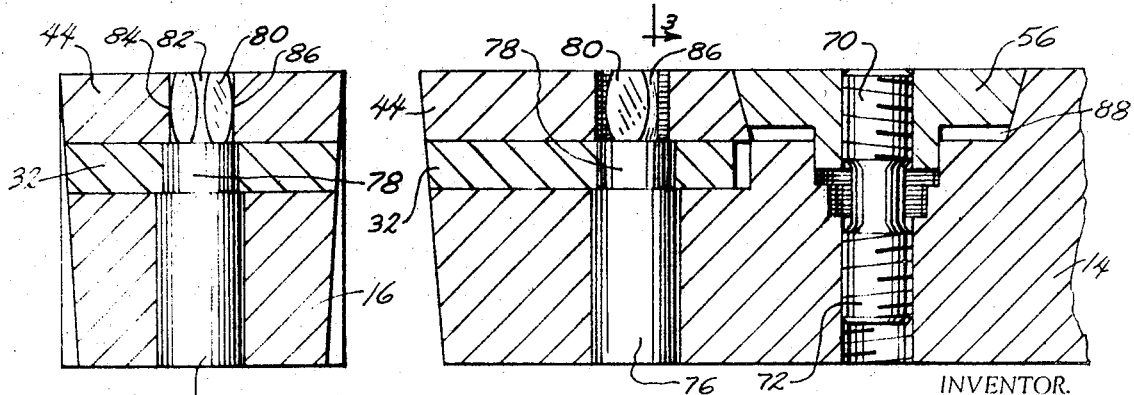
INVENTOR.
MITCHELL KEZRAN

United States Patent Office 3,545,060
Patented Dec. 8, 1970

3,545,060
INTERCHANGEABLE INSERT AND HOLDER ASSEMBLY
Mitchell Kezran, 1157 Narragansett Blvd., Cranston, R.I. 02920
Filed May 20, 1968, Ser. No. 725,232
Int. Cl. B26d 1/00
U.S. Cl. 29—96     8 Claims

ABSTRACT OF THE DISCLOSURE

An interchangeable insert and holder assembly wherein the insert is positioned and held on a holder shank by means of a pin and a cooperating bore formation, the pin and the bore formation having cooperating finished surface formations which are dimensionally controlled to predeterminedly relate the positioning of the insert to the holder. A wedge is provided for wedging the cooperating surface formations together.

---

An object of the present invention is to provide an improved form tool wherein the cutting insert is interchangeable and wherein its positioning is determined by novel means which are simple yet effective.

Another object of the present invention is to provide an improved form tool wherein the interchangeable insert can be predeterminedly positioned with a high degree of accuracy and yet wherein the insert is held with such strength as to be able to perform its cutting function.

Still another object of the present invention is to provide an improved interchangeable insert form tool wherein the insert is aligned with its holder by a novel three-point contact which ensures substantially absolute alignment with each insert change.

Various other objects and advantages will become apparent from the detailed description to follow.

DESCRIPTION OF THE DRAWINGS

In the drawings:

FIG. 1 is an exploded perspective view showing the components of my improved form tool;

FIG. 2 is a top plan view of the forming end thereof;

FIG. 3 is a transverse sectional view taken substantially on the plane of line 3—3 in FIG. 2;

FIG. 4 is a longitudinal sectional view taken substantially on the plane of line 4—4 in FIG. 2.

DESCRIPTION OF THE INVENTION

Referring more particularly to the drawings wherein like numerals apply to like parts throughout, it will be seen that I have provided an improved tool 10 which comprises an insert holder body 12, insert means 44, alignment means 74 and wedge means 56.

The body 12 comprises a shank 14 of selected cross section adapted to be clampingly held at one end, and with a cutting end at 16. The end 16 is beveled or undercut as at 17. The cutting end 16 has a recess 18 formed therein with front section 20 and rear section 22 for purposes to be described.

The rear recess section 22 has an inclined wedging shoulder 24 and counterbore 26 is formed therein with a threaded section at 28.

The forward recess section 20 is of greater depth than the recess section 22 so as to provide a shim-receiving portion of the depth of the shoulder 42. A bore 30 is formed in the holder at the recess 20 and is adapted to receive a pin therein.

The shim 32 is seated in the recess section 20 and has a thickness equal to the height of shoulder 42. The shim has a beveled front face 34, sides 36, 38, and back 40 formed to be flush with the adjacent body surfaces. Shim 32 also is formed with a hole 43 aligned with bore 30.

The insert means 44 is of carbide or other suitable cutting material and is shaped generally to fit over the shim 32 with sufficient excess stock from which the cutting edge 46 is formed. The insert has sides 48, 50 and an inclined back edge surface 52. Also, the insert has a bore formation 54 formed with finished surface formations which are predeterminedly located with respect to the back edge 52 thereof.

The alignment means 74 comprises the bore formation 54 and the cooperating pin 76. Pin 76 has a base portion adapted to be driven into the bore 30 so as to be held thereby. The pin has a reduced diameter section 78 snugly engaged in the hole 43 of the shim and a further reduced section at 80 of critical formation. Section 80 has three flat faces providing three isolated surfaces which are vertically arcuated to provide finished surface formations at 82, 84, 86, interrelated to the formations of the bore 54.

The wedge means 56 includes a block with a boss on its bottom adapted to be received in the counterbore 26. Wedge 56 has a front face 58 which is inclined oppositely to face 52, sides 60, 62 and a rear inclined face 64 adapted to cooperate with shoulder 24. A threaded hole 66 aligns with bore 28 so that the double-ended screw 68 having left-hand and right-hand threaded ends 70, 72 can cooperate therewith to raise and lower the wedge.

It will thus be seen that when all the components are assembled, the screw 68 can function to raise the wedge 56 to release the insert 44 for interchange, or it can function to clamp the insert in position by reason of the interaction between shoulders 64 and 24, and between 52 and 58. Such interaction serves to wedge the insert forwardly so that the bore 54 finished surface formations bear against the finished surface formations 84, 86, leaving only a slight spacing at the formation 82, see FIG. 2. Thus three-point contact is effected at 84, 86 and at edges 52, 58 to provide a locating base of critical exactness whereby the insert back edge is predeterminedly located in relation to the axis of the tool as a whole.

The wedge when fully clamped "down" is spaced as at 88 from the recess floor to allow adequate clamping to be effected.

The reason the wedge is formed with a boss on its bottom is to give added body and strength thereto and a longer threaded surface area.

A feature of this assembly as above described is that it makes possible that the insert have three edges 34, 36, 38 available as cutting or forming edges.

In view of the foregoing it is believed that I have provided an improved tool which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. An interchangeable insert and holder assembly comprising a body having at one end a recess adapted to receive an insert therein, an insert adapted to have a cutting edge formed at its front edge, said insert having a bottom seating surface, a back locating edge and being adapted to be supported on said recess surface, said body recess having a second section formed with a wedging surface and adapted to receive a wedge thereagainst, a wedge having opposing surfaces in predetermined relation to each other and adapted to seat against said wedging surface and said insert, respectively, means connecting said wedge with said holder body and adapted to move said wedge toward seating engagement in said recess and so as to simultaneously engage said wedging surface and said insert, said insert having means predeterminedly aligning the same in relation to the wedge and holder body, said aligning means including a pin and a cooperating bore formation on said insert and holder body, said pin having a pair of finished surface formations dimensionally controlled in relation to the back locating edge of said insert, and said bore formation similarly having finished surface formations dimensionally controlled in relation to said back edge of the insert, said finished surface formations on said pin comprising a pair of vertically and transversely arcuated surfaces.

2. An interchangeable insert and holder assembly according to claim 1 wherein said surface formations essentially consist of a point on each of said arcuated surfaces.

3. An interchangeable insert and holder assembly according to claim 2 wherein said points are dimensionally controlled in relation to said back edge of the insert, said insert having three exposed edges available for cutting edges.

4. An interchangeable insert and holder assembly according to claim 1 wherein said wedge connecting means comprises a double-ended screw with left- and right-hand threading.

5. An interchangeable insert and holder assembly according to claim 1 wherein said pin is rigidly carried on said body and said cooperating bore formation is formed in said insert.

6. An interchangeable insert and holder assembly according to claim 5 wherein said finished surface formations on said pin include a pair of vertically and transversely arcuated surfaces and said finished surface formations essentially consist of a point on each of said arcuated surfaces.

7. An interchangeable insert and holder assembly comprising a body having at one end a recess adapted to receive an insert therein, an insert adapted to have a cutting edge formed at its front edge, said insert having a bottom seating surface, a back locating edge and being adapted to be supported on said recess surface, said body recess having a second section formed with a wedging surface and adapted to receive a wedge thereagainst, a wedge having opposing surfaces in predetermined relation to each other and adapted to seat against said wedging surface and said insert, respectively, means connecting said wedge with said holder body adapted to move said wedge toward seating engagement in said recess and so as to simultaneously engage said wedging surface and said insert, thus moving said insert in a direction away from said wedging surface, said insert having means predeterminedly aligning the same in relation to the wedge and holder body, said aligning means comprising a pin carried by said holder body and a bore in said insert through which said pin extends, said bore being generally circular and said pin being non-circular and having spaced portions that make transverse point contact with the arcuate wall of said bore at two spaced circumferential locations when said insert has been moved to its maximum extent.

8. The assembly of claim 7 further characterized in that said spaced portions make transverse and vertical point contact with the wall of said bore.

References Cited

UNITED STATES PATENTS

| | | | |
|---|---|---|---|
| 3,171,188 | 3/1965 | Stier | 29—96 |
| 3,192,602 | 7/1965 | Copeland | 29—96 |
| 3,192,603 | 7/1965 | Greenleaf | 29—96 |
| 3,176,377 | 4/1965 | Milewski | 29—96 |
| 3,341,921 | 9/1967 | Weller et al. | 29—96 |

FOREIGN PATENTS

| | | | |
|---|---|---|---|
| 1,347,086 | 11/1963 | France | 29—96 |
| 946,112 | 1/1964 | Great Britain | 29—96 |

HARRISON L. HINSON, Primary Examiner